Patented May 21, 1946

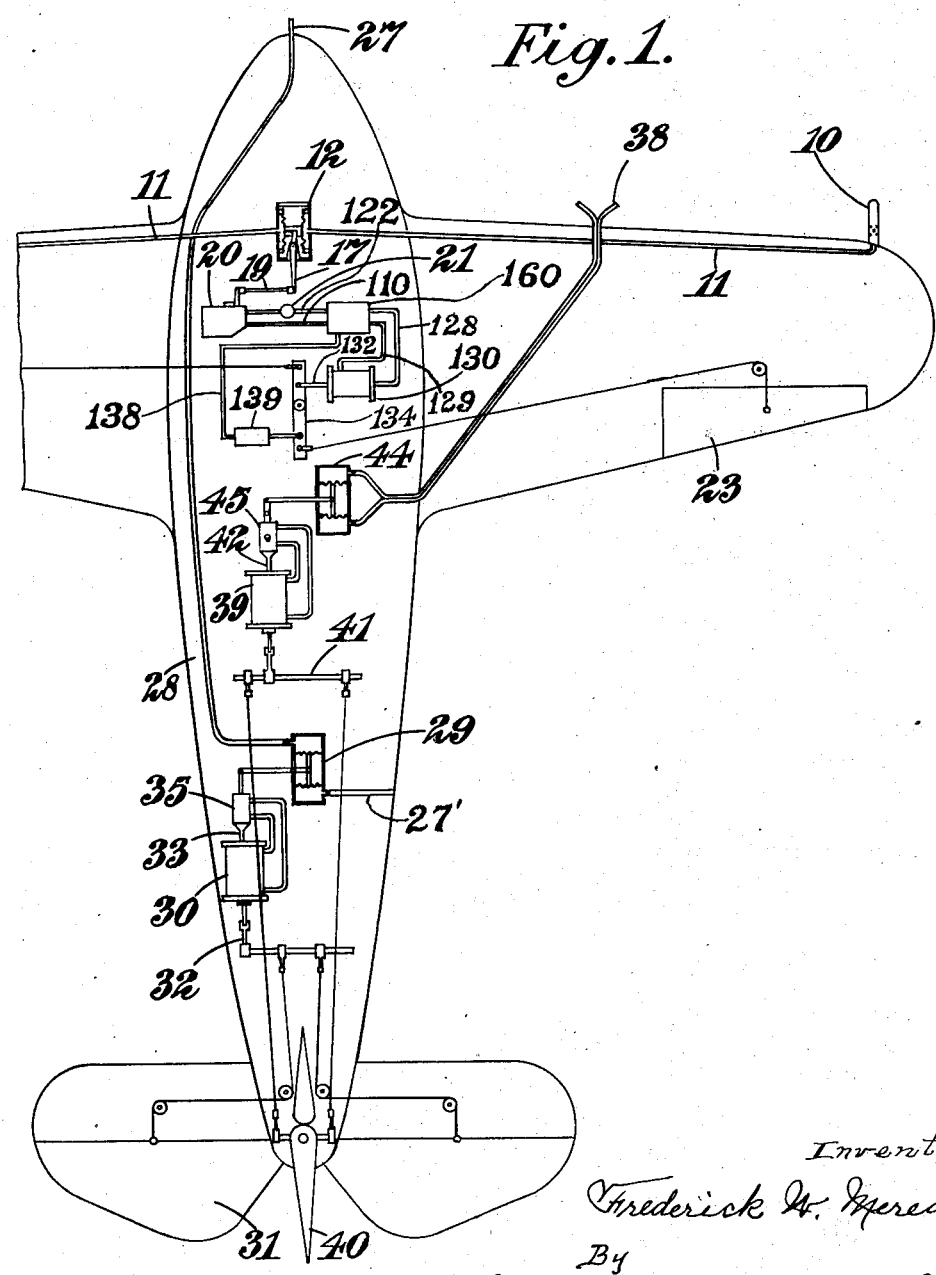

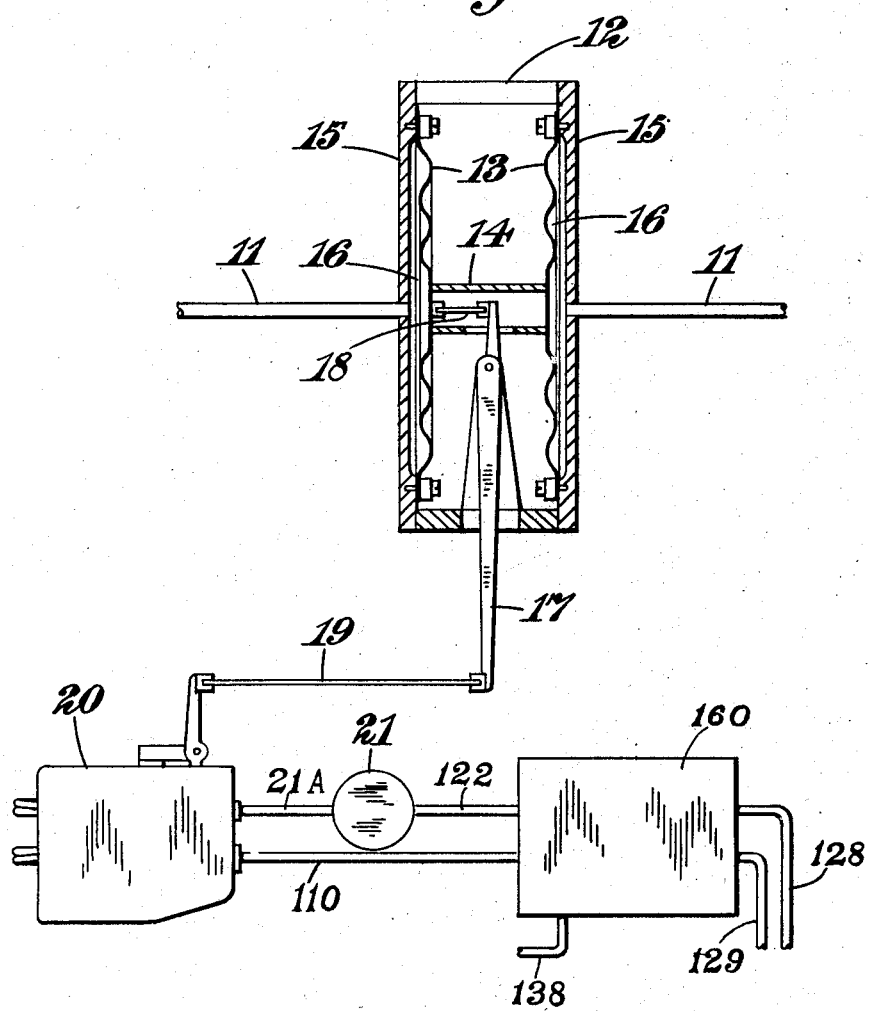

2,400,701

UNITED STATES PATENT OFFICE 2,400,701

CONTROL APPARATUS FOR AIR AND WATER CRAFT

Frederick William Meredith, London, England, assignor to S. Smith & Sons (England) Limited, London, England, a British company Application August 27, 1942, Serial No. 456,400
In Great Britain November 8, 1940

4 Claims. (Cl. 244—78)

This invention relates to apparatus for the automatic control of air and water craft and is primarily concerned with apparatus for automatically maintaining the craft on a given course.

Hitherto, for automatically controlling the course of the craft it has been necessary to use a sensitive and costly instrument such as a compass or a directional gyroscope responsive to deviation from the required course and controlling the operation of the rudder of the craft in order to maintain course. One object of the present invention is to provide a simplified control apparatus in which the use of such sensitive and costly instruments is avoided.

According to this invention, automatic control apparatus for air-borne or water-borne craft, comprises a rate of turn detector, means for integrating the response of the detector so as to obtain a movement corresponding to the deviation from course and means for applying this movement to the appropriate controls for rectifying that deviation.

The rate of turn detector may comprise a differential pressure gauge which receives pressures from two devices disposed apart athwartship and responsive to static pressure. For example, in the case of an aircraft the pressure-responsive devices are placed one on each wing near the tips thereof. The said aircraft control may control either the vertical rudder or the ailerons. In the latter case, by including a component proportional to the rate of turn the aircraft may be stabilised about the roll axis, since, in the absence of side-slip, the rate of turn is proportional to the angle of bank.

The aircraft may be completely controlled about its three axes by manometric apparatus with the advantage that gyroscopic or like delicate instruments are avoided. For example, in addition to a rate of turn indicator there may be provided a detector for indicating dive or climb, such as an airspeed indicator which is linked to the elevator control and a side-slip detector linked to the rudder and/or aileron control, all of which detectors are influenced by aerodynamic pressure changes.

The following is a description of one form of construction according to this invention, reference being made to the accompanying drawings, in which—

Figure 1 is a plan view of an aircraft showing diagrammatically a rate of turn detector, an airspeed detector and a side-slip detector, connected respectively with the ailerons, elevator and rudder, and Figure 2 shows a differential pressure-gauge forming part of the rate of turn detector.

Referring to Figure 1, there is arranged adjacent each wing-tip, a static head 10, of the same kind as is normally used in conjunction with a Pitot pressure-head as a measurement of airspeed. These static heads should be disposed adjacent the wing tips in such positions that they respond only to static atmospheric pressures, indicating the differences in altitude of the respective wing tips. If desired, however, each of these static heads may be replaced by a Venturi head or any device which gives a pressure differing from the dynamic stream pressure by an amount depending upon airspeed.

Pitot dynamic pressure heads may not be employed as the desired pressure difference is cancelled out either by the difference in atmospheric static pressure during a correctly banked turn or by the centrifugal force acting on the connecting column of air during a flat turn or by a combination of both in an incorrectly banked turn. This may be shown as follows. The small static pressure difference derived is also exactly equal to the difference between the two dynamic heads arising from speed difference. This may be expressed by the equation:

$$\tfrac{1}{2}\rho V_H^2 - \tfrac{1}{2}\rho V_L^2 = p_L - p_H$$

where the subscripts H and L indicate the conditions at the instruments on the high and low wings respectively. Therefore, two Pitot tubes would give no difference whatsoever since the Pitot heads are represented by the following equations:

$$K_H = p_H + \tfrac{1}{2}\rho V_H^2$$
$$K_L = p_L + \tfrac{1}{2}\rho V_L^2$$

These static heads 10 are connected by conduits 11 to a differential pressure-gauge 12 which is shown in detail in Figure 2. The gauge comprises two diaphragms 13 which are connected together by a tubular element 14 and are clamped respectively to two plates 15 forming the body of the gauge so as to provide spaces 16 in communication with the two conduits 11. The resultant movement of the two diaphragms is transmitted to a pivoted lever 17 which is connected at one end through link mechanism 18 with the diaphragm assembly, and at the other end through a link mechanism 19 with a repeating apparatus 20 such as is described in British Patent No. 526,101, complete specification accepted September 11, 1940. This repeating apparatus is capable of converting the movements of the diaphragms into variations of air pressure in a pipe 110 without imposing any appreciable load on the diaphragms. Air is supplied to the apparatus 20 from a source of air pressure 21, through a pipe 21A. The pipe 110 of the repeating apparatus leads to a servo control apparatus 160 of a character such as is described in the specification of United States patent application Ser. No. 2,303,752, granted December 1, 1942, and which incorporates means to integrate the response of the pressure gauge 12 and the associated repeating apparatus, and to apply a movement having a part corresponding to the response and a part corresponding to the time integral of the response to the ailerons 23. This is effected by the servomotor 130, connected by means of piston rod 132 with suitable lever-link mechanism 134. A follow-up mechanism 139 is operated in the manner described in prior specification of United States patent application Ser. No. 2,303,752 to introduce the integral term. Air is supplied from the source 21 to the device 160 through the pipe 122; connections 128 and 129 are provided between the device 160 and the servomotor cylinder 130; a communication is effected between the follow up mechanism 139 and the device 160 through the conduit 138. The arrangement is clearly described in my Patent No. 2,303,752 and includes an elastic viscous follow-up whereby the follow-up subsides to zero with an exponential time lag. The effect of this is substantially to add the integral of the valve displacement. The parts of the illustrated device which correspond to equivalent parts in Patent 2,303,752 are designated by the same reference numerals with 100 added.

The elevators 31 are controlled by an airspeed detector 29 connected in the usual way to a dynamic head 27 and a static head. Alternatively, the pressure in an aircraft cabin may be used as the static pressure datum. This detector is arranged to control the valve 35 of a servomotor 30, which motor operates the elevators 31 through suitable mechanism 32. The valve is also influenced by a follow-up mechanism 33 associated with the servomotor. The elevators are thus controlled to maintain the airspeed constant.

Side-slip of the aircraft is controlled by a side-slip detector 38 comprising a dual pressure head with which is associated a servomotor 39 in the manner described in prior specification of United States Patent No. 2,323,151, granted June 29, 1943, with reference to Figure 3 thereof. This servomotor is connected to the rudder 40 through suitable mechanism 41. The two pressures provided by the detector may be arranged to operate a differential pressure gauge 44 somewhat similar to that described above, which gauge controls the valve 45 of the servomotor, which is also under the control of a follow-up mechanism 42. The rudder is thus controlled so as substantially to eliminate side-slip.

Returning now to the rate of turn indicator and its associated servomotor control, it will be remembered that the movement imparted by the servomotor has both a part proportional to the pressure differences provided by the two pressure heads 10, and a part proportional to the integral of the pressure differences. The pressure difference is proportional to the rate of turn and so the integral thereof is proportional to the actual turn or deviation. Since the servomotor is connected to the ailerons, the ailerons are thus moved $a\psi + b\psi$ where $\psi$ is the angle of deviation from the required source and $a$ and $b$ are constants. The side-slip of the aircraft is substantially prevented by the aforesaid side-slip detector and associated controlling mechanism, and if there is no side-slip, the term $\psi$ is proportional to $\phi$, the angle of bank. Consequently, the ailerons are controlled in accordance with $a'\int \phi dt + b'\phi$ where $a'$ and $b'$ are constants. Consequently, as was shown in specification of United States Patent No. 2,323,151 the control of the ailerons in this manner provides not only course control, but also stabilisation of the aircraft about the roll axis.

I claim:

1. An automatic course control apparatus of the class adapted for use in air-borne or water-borne craft, which comprises a manometric rate of turn detector which includes means responsive to differences in static pressures only between points on the craft which are spaced apart athwartship, means for integrating the response of said detector so as to obtain a movement corresponding to the deviation from course, and means for applying said movement to the appropriate controls of the craft for rectifying said deviation.

2. The control apparatus set forth in claim 1 in which the rate of turn detector comprises a differential pressure gauge, two devices responsive to static pressure only and spaced apart athwartship, and means operatively connecting each of said devices to said pressure gauge to communicate their static pressure response thereto.

3. The control apparatus set forth in claim 1 in which the rate of turn detector comprises a differential pressure gauge, two devices responsive to static pressure only, one disposed on each wing near the tip thereof, and means operatively connecting each of said devices to said pressure gauge to communicate their static pressure response thereto.

4. In an aircraft having rolling controllers, such as ailerons, an automatic course maintaining apparatus comprising manometric detector means responding in proportion to the rate of turn of the craft, means for operating said rolling controllers, and connections between said last named means and said first named manometric means, said connections including means for causing said last named means to respond in accordance with both the detected rate of turn and the time integral of said rate of turn, whereby said controllers are actuated to restore the craft to course.

FREDERICK WILLIAM MEREDITH.